(12) United States Patent
Lund

(10) Patent No.: US 6,178,676 B1
(45) Date of Patent: Jan. 30, 2001

(54) WARNING DEVICE FOR USE WITH VEHICLES

(75) Inventor: John Iver Lund, Chicago, IL (US)

(73) Assignee: Cortina Tool & Molding Co., Franklin Park, IL (US)

( * ) Notice: Under 35 U.S.C. 154(b), the term of this patent shall be extended for 0 days.

(21) Appl. No.: 09/483,407

(22) Filed: Jan. 14, 2000

(51) Int. Cl.[7] ....................................... E01F 9/10
(52) U.S. Cl. ..................... 40/591; 40/903; 116/63 T
(58) Field of Search ................. 40/591, 903; 116/63 T

(56) References Cited

U.S. PATENT DOCUMENTS

| | | |
|---|---|---|
| 3,024,552 | 3/1962 | MacLea . |
| 3,703,152 * | 11/1972 | Morton ............................. 116/63 T |
| 3,738,039 | 6/1973 | DeFuria . |
| 3,791,336 | 2/1974 | ZDebski . |
| 3,934,541 | 1/1976 | May et al. . |
| 3,934,542 | 1/1976 | May et al. . |
| 3,975,849 * | 8/1976 | Tuleja ............................... 116/63 T |
| 4,002,138 | 1/1977 | Dobala . |
| 4,015,557 | 4/1977 | Schulein . |
| 4,178,874 | 12/1979 | Berns et al. . |
| 4,325,318 * | 4/1982 | Kitrell ............................... 116/63 T |
| 4,348,978 | 9/1982 | Brulato . |
| 4,375,134 | 3/1983 | Sheetz . |
| 4,519,153 | 5/1985 | Moon et al. . |
| 4,754,565 | 7/1988 | Cox . |
| 4,884,524 | 12/1989 | Minotti . |
| 5,048,451 | 9/1991 | Reimers et al. . |
| 5,062,380 | 11/1991 | Chestnutt . |
| 5,195,264 * | 3/1993 | Johanson et al. .................... 40/591 |
| 5,249,381 | 10/1993 | Panossian . |

* cited by examiner

Primary Examiner—Cassandra H. Davis
(74) Attorney, Agent, or Firm—Van Metre Lund

(57) ABSTRACT

A warning device includes three components of an orange fluorescent material that carry reflectors of a red reflex reflective material. The components are pivotally connected to be operable to a compact folded condition. In an unfolded operative condition, an attachment structure secures a lower end portion of a first component to the upper edge of a vehicle window. The first component then extends outwardly at a sixty degree angle, a second component then extends horizontally outwardly from the lower end of the first component and the third component then extends inwardly and upwardly and at a sixty degree angle from the outer end of the second component to the upper end of the first component. The device then presents a triangularly shaped area having an outer border defined by the reflectors and an inner border defined by portions of the components. The attachment structure is sturdy and provides a reliable support of the device while being of a small size. The device is designed for use with windows having a wide range of angles to the horizontal and it is economically manufacturable.

8 Claims, 4 Drawing Sheets

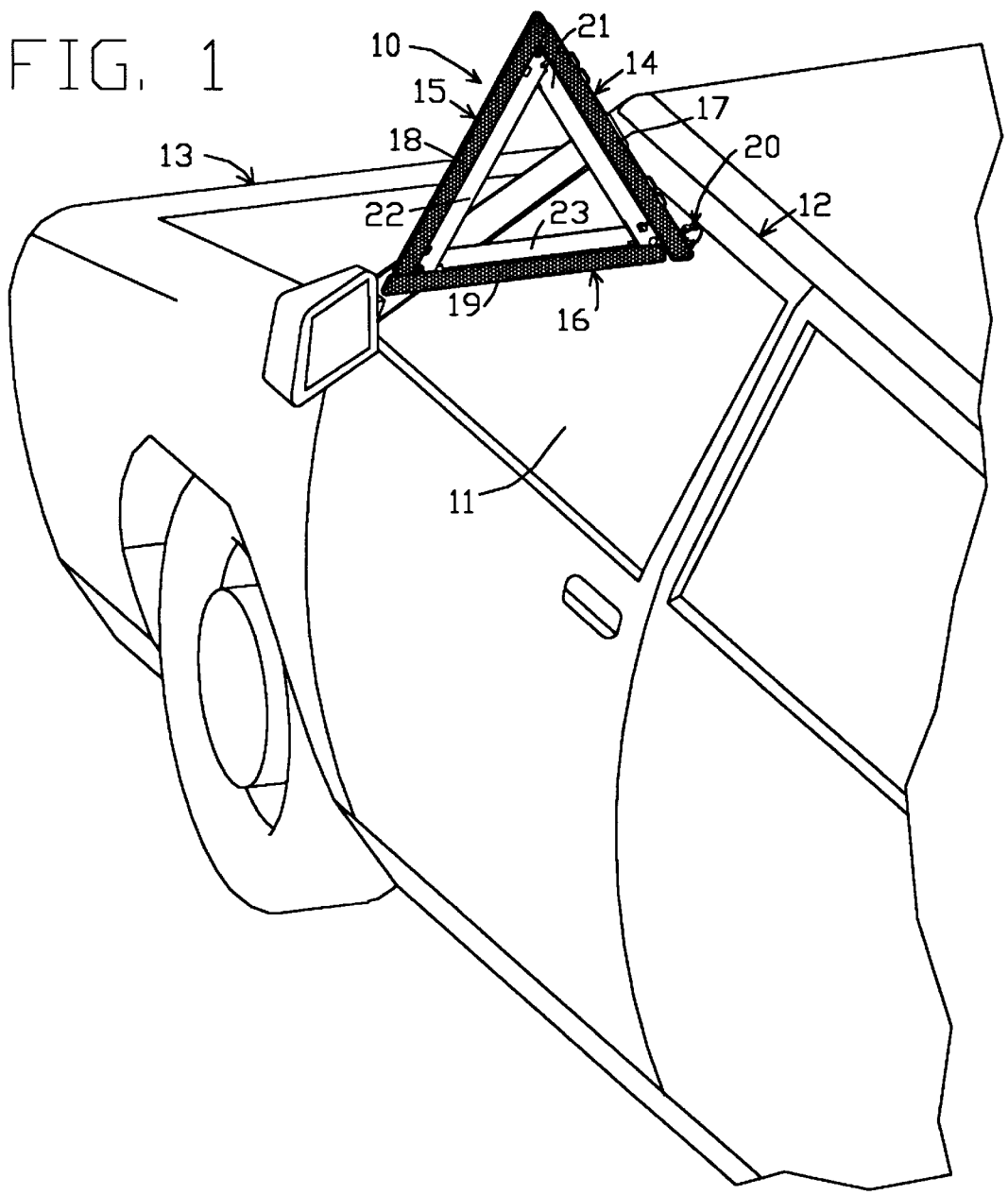

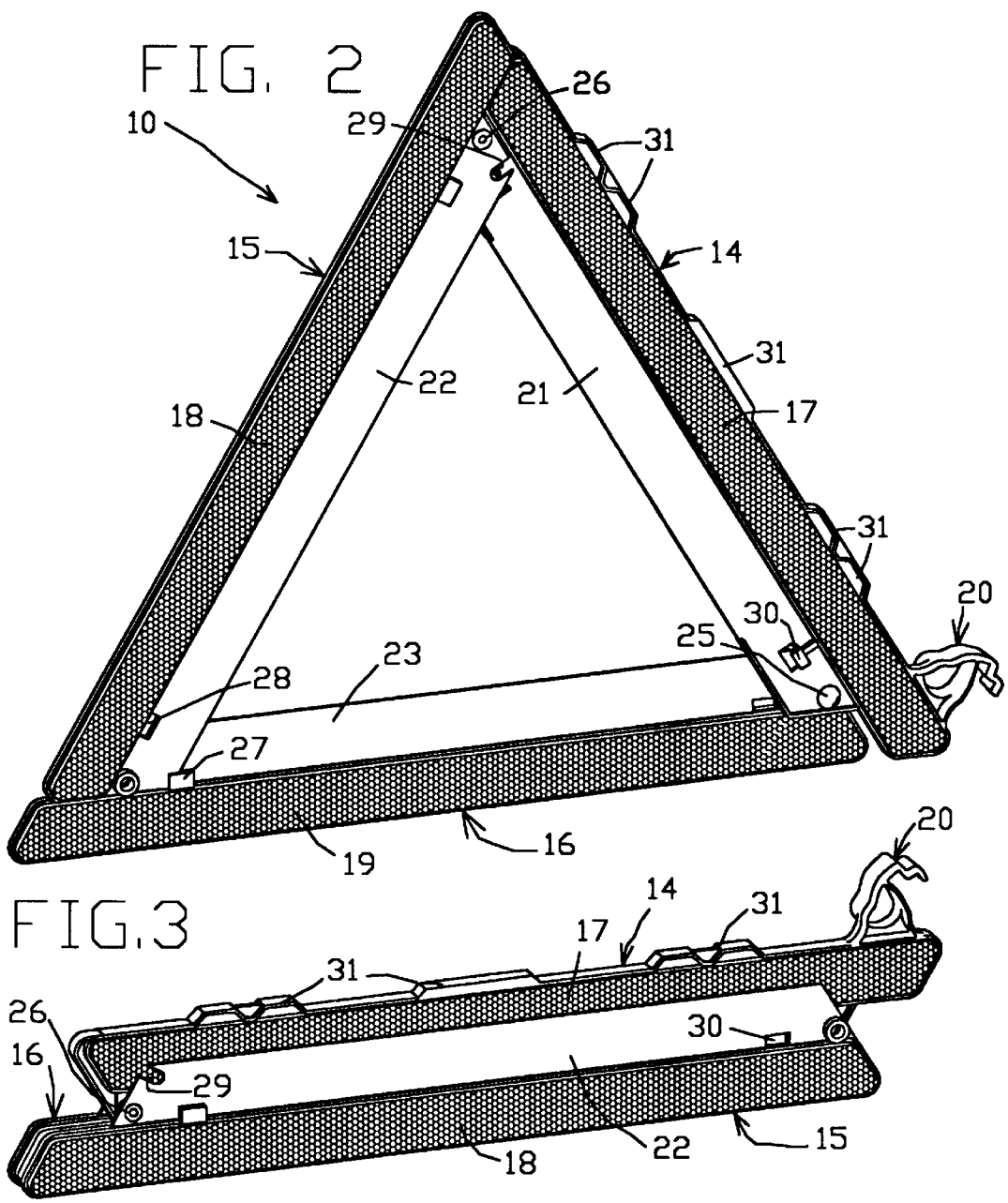

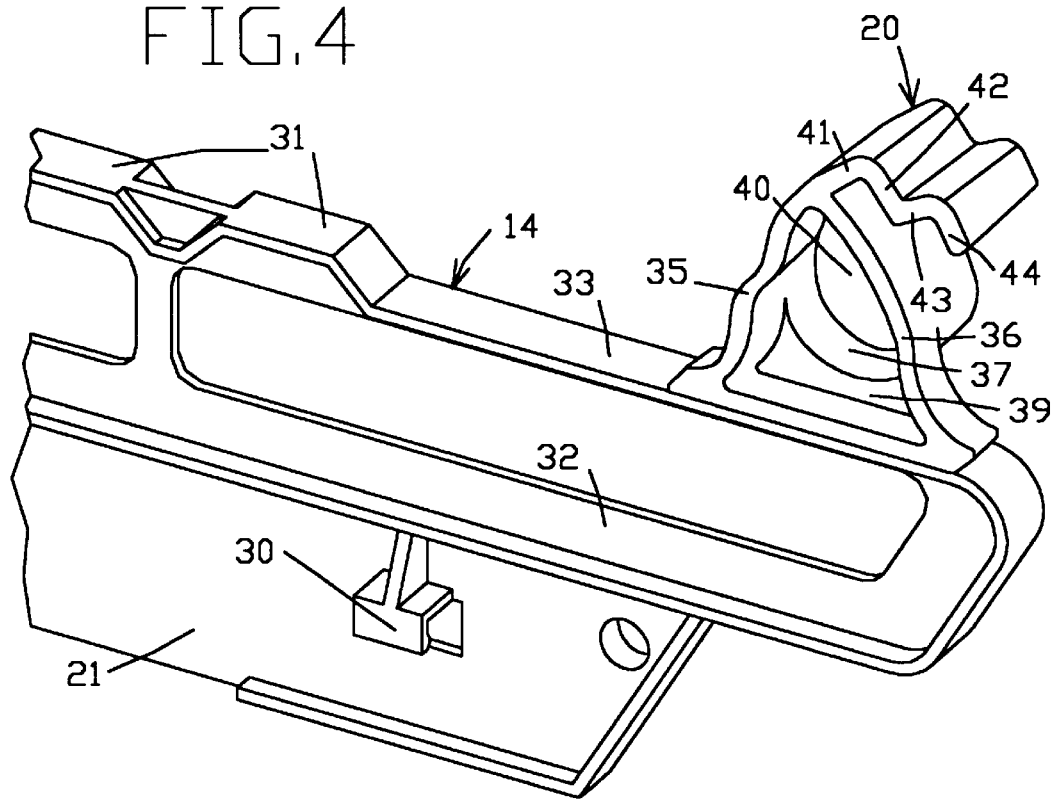

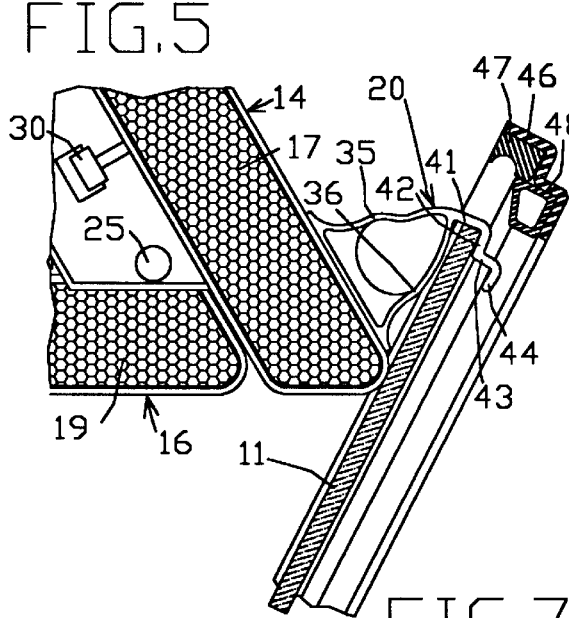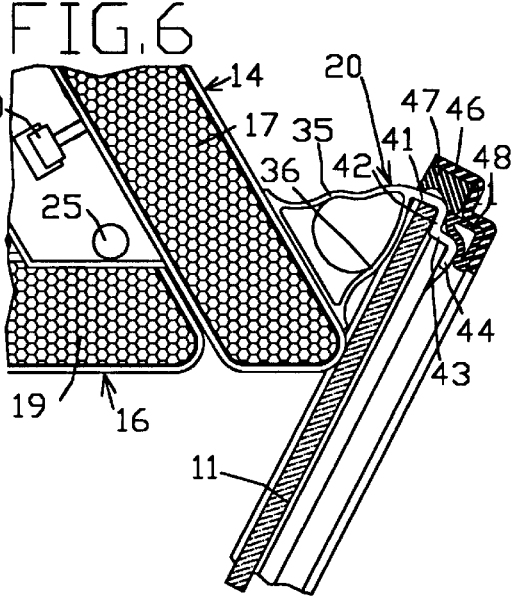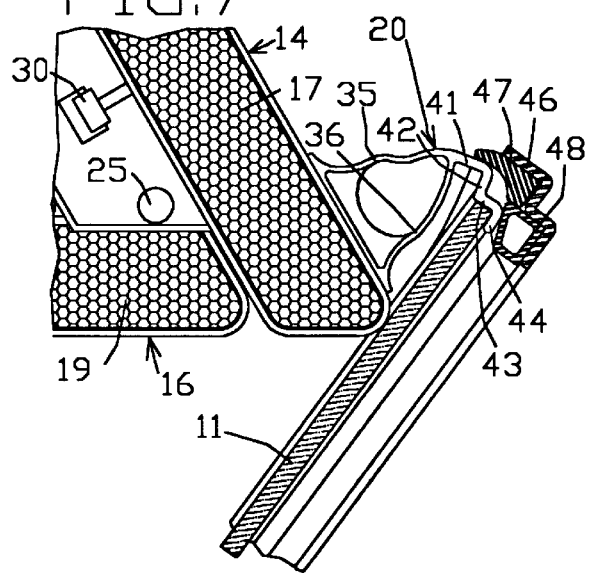

WARNING DEVICE FOR USE WITH VEHICLES

BACKGROUND OF THE INVENTION

1. Field of the Invention

This invention relates to a warning device for use with automobiles or other vehicles and more particularly to a warning device that can be attached to a disabled vehicle. The warning device of the invention can be readily and securely attached to a vehicle window, provides a clear and unmistakable indication of the condition of the vehicle, is foldable for compact storage and is economically manufacturable.

2. Background of the Prior Art

Many indicating devices have heretofore been used or proposed for use with automobiles or other vehicles for providing an indication that the vehicle is disabled or for other purposes.

In one type of device, warning signal means of various types are hooked onto the window of an automobile to be supported therefrom. Devices of this type are disclosed in U.S. Patents including MacLea U.S. Pat. No. 3,024,552 issued Mar. 13, 1962, DeFuria U.S. Pat. No. 3,738,039 issued Jun. 12, 1973, Zdebski U.S. Pat. No. 3,791,336 issued Feb. 12, 1974, Tuleja U.S. Pat. No. 3,975,849 issued Aug. 24, 1976, Dobala U.S. Pat. No. 4,002,138, issued Jan. 11, 1977, Schulein U.S. Pat. No. 4,015,557, Berns et al. U.S. Pat. No. 4,178,874 issued Dec. 18, 1979, Brucato U.S. Pat. No. 4,348,979, Sheetz U.S. Pat. No. 4,375,134, Moon et al. U.S. Pat. No. 4,519,153, issued May 28, 1985, Cox U.S. Pat. No. 4,754,565 issued Jul. 5, 1988, Minotti U.S. Pat. No. 4,884,524 issued Dec. 5, 1989, Reimers et al. U.S. Pat. No. 5,048,451 issued Sep. 17, 1991, Chestnutt U.S. Pat. No. 5,062,380 issued Nov. 5, 1991 and Panossian U.S. Pat. No. 5,249,381. So far as is known, devices of this first type have not been in extensive use.

A second type of device is shown in the May et al. U.S. Pat. Nos. 3,934,541 and 3,934,542 issued Jan. 27, 1976 and includes a reflective base member and a pair of reflective side members which are pivotally connected to opposite ends of the base member to be swingable between folded positions adjacent the base member and inclined erected positions in which the three members form an upright triangular reflective warning device. Devices have been made and sold in which each member has had a length of at least sixteen inches and each has included a red reflective material for providing a nighttime warning and forming part of an outer border of a triangular shape and a portion of an orange fluorescent material for providing a daytime warning and forming part of an inner border of the triangular shape. In such devices, the base member has included legs for support thereof in a horizontal position on a highway surface and has been weighted by auxiliary members connected thereto. This type of device has provided a clear indication of distress and has been used extensively for trucks with considerable commercial success.

SUMMARY OF THE INVENTION

This invention was evolved with the general object of improving upon prior art devices and providing a warning device usable on all types of vehicles to provide a clear and unmistakable indication of a distress condition and of a need for approaching traffic to exercise caution.

Another object of the invention is to provide a device that is rugged, durable and reliable while being economically manufacturable.

An important aspect of the invention relates to the recognition of problems with prior devices and an analysis of what is needed in terms of desired results and of what is needed to achieve such desired results.

The first type of devices, in which warning means are hooked onto a window of an automobile or otherwise supported on an automobile, have many limitations particularly with respect to providing a desired clear and unmistakable distress signal. The most desirable shape is a triangular shape with a horizontal base and upstanding legs, a shape which is universally recognized as a distress signal. The only known disclosures of the first type of device that have such a shape are in the Tuleja and Reimers et al. patents but the devices of those patents are of a small size and have constructions which would present problems if attempts were made to make them in a larger size, especially with respect to storage of the device when not in use.

The second type of device has advantages which account for its success but has disadvantages as well. The success appears to be the result of a number of factors. One is that the devices have the triangular shape that is universally recognized as a distress signal. Another factor is a large size. A further factor is the use of both reflective and fluorescent materials. Still another is that although the device has a relatively large size in its operative condition, it can be folded into a compact size for storage before and after use.

However, the second type of device requires support of the base member on a highway surface, thereby requiring auxiliary members for support and for adding weight thereto, adding to the size of the devices, and adding to problems in storage as well as adding to costs of manufacture.

In accordance with the invention, an assembly of three elongated components is provided that have light reflecting means thereon and that can be selectively positioned in either an operative condition in which said reflecting means form a triangular shape or an inoperable folded condition in which components are in a registering relation to provide a compact assembly for storage, and an attachment structure is provided on one of the components to secure it to a vehicle and for functioning in the operative condition to position one of the reflecting means in a generally horizontal position and to place the other two reflecting means in positions extending upwardly from opposite ends of the horizontal reflecting means to meet and form a triangular shape in a vertical plane for maximum visibility.

The device avoids the aforementioned disadvantages of the base-mounted devices but has the same advantages with respect to producing a clear and unmistakable indication of distress. Each of the light reflecting means can be of a red reflective material for providing a nighttime warning and forming part of an outer border of the triangular shape while each of elongated components can include a portion of an orange fluorescent material for providing a daytime warning and forming part of an inner border of triangular shape. The device has a further advantage over the base-mounted devices in that it can be positioned well above a highway surface for increased visibility.

In accordance with further important features of the invention, the attachment structure is arranged for attachment to a side window of a vehicle and is preferably located at a lower end of an upwardly extending component to position the horizontal reflecting means at the same elevation as the upper edge of the window and it extends out a distance which is no more than a small fraction of the length of the component so as to minimize the size of the assembly when in its inoperable folded condition.

In a preferred arrangement, the attachment structure includes a window-engaging portion that provides a surface for engagement with the upper edge surface of a window and a surface for engagement with a portion of an inner surface of the window adjacent its upper edge. In virtually all cases, the frame of a vehicle window includes a resilient sealing material for engagement with the upper edge portion of the window. When the window is moved upwardly toward a closed position, the window-engaging portion of the attachment structure is clamped between the upper edge portion of the window and the resilient sealing material to resiliently but securely hold the device against excessive tilting in directions parallel to the longitudinal axis of the vehicle as well as in a transverse direction away from the window.

In accordance with additional features of the invention, the attachment structure is arranged for selective use with windows positioned at different angles to the horizontal while positioning one of said reflecting means in a position to provide the horizontal base of a triangular shape in each case. For each of a plurality of ranges of angles, two surfaces are provided, one for engagement with the upper surface of the window a second for engagement with an inside surface of the window adjacent its upper edge. With two pairs of such surfaces, the device can be used with virtually all vehicles in current use and yet obtain nearly optimum positioning of the triangular shape.

Still further features of the invention relate to details of construction of the attachment structure by which it is very sturdy and reliable while allowing it to be of small size and readily molded and otherwise facilitating economic manufacture of the device.

This invention contemplates other objects, features and advantages which will become more fully apparent from the following detailed description taken in conjunction with the accompanying drawings.

BRIEF DESCRIPTION OF THE DRAWING FIGURES

FIG. 1 is a perspective view showing a device of the invention in an operative condition in which it is mounted on an automobile window;

FIG. 2 is an enlarged perspective view of the device of FIG. 1, by itself but in its operative condition;

FIG. 3 is an enlarged perspective view of the device of FIG. 1 in an inoperative folded condition;

FIG. 4 is a further enlarged perspective view of a portion of a component of the device and an attachment structure formed as a part thereof;

FIG. 5 is a front elevational view showing a portion of the device and portions of a window and frame structure of a vehicle, the device being shown in a position in which an attachment structure has been hooked onto the vehicle window;

FIG. 6 is a view like FIG. 5, but showing a condition in which the window has been raised to produce a clamping action on the attachment structure of the device; and FIG. 7 is a view like FIG. 6 but showing the condition for a vehicle that has a window sloped at a less steep angle to the horizontal.

DESCRIPTION OF A PREFERRED EMBODIMENT

Reference numeral 10 generally designates a warning device constructed in accordance with the principles of this invention. In FIG. 1, the device is shown in a operative condition attached to the side window 11 of a door 12 of an automobile 13 which may be in a disabled condition, parked along a highway. The device is then readily visible to the occupants of approaching vehicles in either the day or the night and it then provides an appearance which is universally recognized as a distress signal, being in the form of an equilateral triangle with two legs extending upwardly and inwardly at sixty degree angles from the opposite ends of a horizontal base.

FIG. 2 shows the device 10 by itself in its operative condition and on a larger scale while FIG. 3 shows the device 10 in a compact folded inoperative condition in which it may be stored in a vehicle before and after use.

An important feature of the device 10 is that it includes an foldable assembly having a construction that has previously been provided for mounting on a weighted base on a highway. The device 10 provides many of the advantages of such devices, including foldability, and it can be made with only relatively small changes in the mold for one component. The assembly includes three elongated components 14, 15 and 16 which carry light reflectors 17, 18 and 16. Each component includes a visible portion along the inside of the reflector it carries and each component is preferably formed of a plastic material having flourescent qualities for improved visibility especially in daylight. Each reflector is preferably formed of a red plastic material having internal prism formations for reflecting light from the headlights of approaching vehicles. Means are provided for securing end portions of the components 14, 15 and 16 together for selective positioning thereof in either the operative condition of FIGS. 1 and 2 or the folded inoperative condition of FIG. 3 in which the components are in a compact registering relation.

Important features relate to an attachment structure 20 that is provided for securing the device 10 to the window 11 of the automobile 13. The attachment structure 20 operates to insure an operative condition in which component 16 and reflector 19 are horizontal while components 14 and 15 and reflectors 17 and 18 extend upwardly from opposite ends of component 16 and reflector 19 to meet at upper ends. The triangle that is thereby provided is in a vertical plane for ready visibility.

The attachment structure 20 supports the device from an upper edge portion of the window 11 and is positioned on a lower end portion of the component 14 in alignment with the reflector 19, thereby supporting the device in a high position relative to the automobile 13 for increased visibility. When so positioned, the lower end of the component 14 rests against the window 11 to assist in supporting the device. Attachment structure 20 extends out from the component 14 only a short distance as shown, no more than a small fraction of the length of the component, so as to minimize the size of the assembly when in the folded condition shown in FIG. 3.

The components 14, 15 and 16 have planar portions 21, 22 and 23 which are on the inside of the triangle formed by the reflectors 17, 18 and 19 in the operative condition of FIGS. 1 and 2. The reflectors 17, 18 and 19 are preferably of a red reflex reflective material and form an outside border of uniform width operative for nighttime warning. The components 14, 15 and 16 are preferably of an orange fluorescent material, the portions 21, 22 and 23 forming an inside border of uniform width operative for daytime warning. Each of the outer edges of the triangular shape so formed has a length of at least sixteen inches, preferably nearly 17 inches, the reflectors have a width of at least three-fourths of an inch and each of the planar portions 21, 22 and 23 of orange fluorescent material has a width of at least one inch. The device thereby provides a triangular shape that is of large size and that is readily visible in either nighttime or daytime hours to provide an unmistakable distress indication. At the same time, the device is foldable into a compact unit for storage before and after use.

For foldability, a connector element 25 provides a pivotal connection between an upper end of the planar portion 21 of component 14 and an upper end of the planar portion 22 of component 15. A connector element 26 provides a pivotal connection between the lower end of the planar portion 21 of component 14 and the right end of the planar portion 23 of component 16.

In the operative condition of FIGS. 1 and 2, the lower end of the planar portion 22 of component 15 is securely but releasably connected to the left end of the planar portion 23 of component 16. In particular, the lower end of the portion 22 is in front of the portion 23 as viewed and extends under a tab 27 formed on the portion 23. A similar tab 28 of the portion 22 is behind an opening in portion 22 and is behind the portion 23. In addition, a projection from the rear side of portion 22 extends into a slot in the left side of portion 23. The slot in portion 23 is not shown, being behind the portion 22 as viewed, but it is like a slot 29 in upper end of portion 22 as viewed in FIG. 2 or the left end of portion 22 as viewed in FIG. 3. A number of features of components 15 and 16 are shown that are not functional, including the slot 29 in portion 22 of component 15, but are provided in order that the components 15 and 16 may be made using identical molds for economy of manufacture.

In the folded inoperative condition of FIG. 3, the tab 28 that extends rearwardly from portion 22 of component 15 interlocks with a tab 30 that extends forwardly from one end of the portion 21 of component 14. Similarly, the tab 27 that projects forwardly from the portion 23 interlocks with a tab that is similar to the tab 30 and that projects rearwardly from an opposite end of the portion 21 of component 14. Planar portions of all three components are in parallel planes in FIG. 3, which is not the case in FIG. 2 since the lower ends of portions 21 and 22 are in front of the portion 23 as viewed, while the upper end of portion 21 is behind the upper end of portion 22 as viewed. The components bend to allow this to be the case but in doing so develop frictional forces that help in securely holding the components 15 and 16 in interlocked relation in the operative condition of the device.

The foldable assembly of components 14–16 and reflectors 17–19 has the same advantages as foldable assemblies previously provided for mounting on a weighted base and is also advantageous in that the same mold can be used for the components 15 and 16 as used previously and only relatively small changes are required for the mold used for component 14. To make the component 14, leg structures provided at opposite ends of the corresponding component of a base-mounted device are eliminated while one of such leg structures is replaced by the attachment structure 20. To avoid the expense of other modifications, other structures of the component of the base-mounted device are retained, as indicated by reference numeral 31.

The attachment structure 20 is so constructed as to provide a high strength and a secure support of the device 10 from a vehicle window while being readily molded as an integral part of the component 14. An additional important feature is that it is usable to support the device from windows positioned within a wide range of angles to the horizontal while keeping the component 16 and reflector 19 in a substantially horizontal position.

FIG. 4 more clearly shows portions of the component 14 without the reflector 17. The component 14 includes a web portion 32 in the same plane as the planar portion 21 and a flange portions 33 that extends in both directions from the periphery of the web portion 32 and that includes the aforementioned structures 31 that are not functional in the illustrated device. The reflector 17 and an identical reflector for the opposite side of the device are secured to opposite sides of the web portion 32, preferably by an ultrasonic welding operation. Each of the components 15 and 16 has generally the same construction as the component 14 with reflectors secured to opposite sides of the web portions thereof. However, the flange portions of the components 15 and 16 are of reduced width and there are no structures corresponding to the non-functional structures 31.

The attachment structure 20 includes main wall portions 35 and 36. In the operative condition, the wall portion 35 is above the wall portion 36 and extends horizontally and in an outward direction toward the window of the automobile while the wall portion 36 extends outwardly and upwardly to join the upper wall portion 35. Both the upper and lower wall portions 35 and 36 have inward parts of the same width as that of the component 14 and outward parts of greater width to provide extensions that are joined by an arcuate wall portion 37 and that extend in a rearward direction as viewed in FIGS. 2, 3 and 4. To strengthen the upper and lower wall portions 35 and 36 against bending, a wall portion 39 is provided that is on the rearward side of the structure. The wall portion 39 joins forward edge of the arcuate wall portion 37 and the rearward edges of the inward parts of the upper and lower wall portions 35 and 36. A second rearward wall portion 40 joins the rearward edge of the arcuate wall portion 37 and rearward edges of the rearward extensions of the upper and lower wall portions 35 and 36. This configuration results in a sturdy support of the device 10 from additional wall portions that extend from the junction of the upper and lower wall portions and that are provided for engagement with surfaces of windows at various angles to the horizontal.

The additional wall portions include a wall portion 41 that extends outwardly and downwardly and a wall portion 42 that extends downwardly and inwardly from the outer edge of the wall portion 41. The lower surface of the wall portion 41 and the inward surface of the wall portion 42 are at angles for engagement with upper surface and inner surfaces of windows positioned within a first range of angles to the horizontal. The additional wall portions further include a wall portion 43 that extends outwardly and downwardly from the lower edge of wall portion 42 and a wall portion 44 that extends downwardly and inwardly from the outer edge of the wall portion 43. The lower surface of the wall portion 43 and the inward surface of the wall portion 42 are at angles for engagement with upper surface and inner surfaces of windows positioned within a second range of angles to the horizontal. When the device 10 is positioned with the component 16 and reflector 19 in horizontal positions, the angles of the wall portions 41, 42, 43 and 44 are preferably about 22, 68, 32 and 58 degrees respectively, allowing the device to be used with the vast majority of vehicles in current use, including trucks, sport vehicles, vans and sport utility vehicles as well as conventional passenger vehicles of all sizes.

The device is installed on the illustrated automobile 13 by being hooked onto the window 11 as shown in FIG. 5 and is then securely locked to the door 12 by moving the window 11 in a closing direction as shown in FIG. 6. FIG. 7 is similar to FIG. 6 but illustrates the operation when the window 11 is positioned at a less steep angle to the horizontal. Portions of the mounting for the window 11 are shown in cross-section in a manner that is not intended to show the construction of any particular mounting but to provide a representational showing. Window mounting structures typically include a metal frame member such as indicated by reference numeral 46 that supports a member 47 of resilient elastomeric material for engaging the upper edge of the window 11 and a second member 48 of a resilient elastomeric material for engaging an upper inside portion of the window 11.

With the window 11 in a partially open condition as shown in FIG. 5, the wall portion 41 may be engaged with the upper edge of the window 11 while wall portion 42 is engaged with an inside upper edge portion of the window. Then the window may be moved toward a closed position to compress the resilient members 47 and 48 as shown in FIG. 6. If the window 11 is at a less steep angle, the wall portion 43 may be engaged with the upper edge of the window while wall portion 44 is engaged with an upper inside edge portion of the window, resulting in a condition as shown in FIG. 6 when the window is moved toward a closed position. In both cases, high concentrated frictional forces are applied by compression of the resilient members 47 and 48 to hold either the lower and inside surface of walls 41 and 42 or the lower and inside surfaces of walls 43 and 44 in tight engagement with upper and inside surfaces of the window, thereby securely holding the device 10 against excessive tilting away from the automobile or in either a forward or rearward direction.

It will be understood that modifications and variations may be effected within the spirit and scope of the novel concepts of this invention.

I claim:

1. A warning device comprising: an assembly of three elongated components having light reflecting means thereon, means for securing end portions of said components together for selective positioning thereof in either an operative condition in which said reflecting means form a triangular shape or an inoperable folded condition in which components are in a registering relation to provide a compact assembly for storage, and attachment means for functioning in said operative condition of said components to secure one of said components to a vehicle while placing one of said reflecting means in a generally horizontal position and placing the other two reflecting means in positions extending upwardly from opposite ends of said one of said reflecting means to meet and form a triangular shape in a vertical plane for maximum visibility, said attachment means being at a lower end of said one of said components when said components are in said operative condition and being arranged to be then secured to an upper edge portion of a side window of said vehicle to then position said one of said reflecting means at the elevation of said upper edge portion of said window and said device at an elevated position relative to said vehicle, wherein said attachment means so function when securing said one of said components to said window that upper edge portions of said window are engaged by said attachment means while a lower portion of said window is engaged by a lower end portion of said one of said components.

2. A warning device as defined in claim 1, wherein said attachment means extend out a distance which is no more than a small fraction of the length of said one of said components so as to minimize the size of said assembly when in said folded condition.

3. A warning device as defined in claim 1, wherein said attachment means are arranged for selective use with windows positioned within different ranges of angles to the horizontal while positioning said one of said reflecting means in a generally horizontal position in each case.

4. A warning device comprising: an assembly of three elongated components having light reflecting means thereon, means for securing end portions of said components together for selective positioning thereof in either an operative condition in which said reflecting means form a triangular shape or an inoperable folded condition in which components are in a registering relation to provide a compact assembly for storage, and attachment means for functioning in said operative condition of said components to releasably secure one of said components to a vehicle while placing one of said reflecting means in a generally horizontal position and placing the other two reflecting means in positions extending upwardly from opposite ends of said one of said reflecting means to meet and form a triangular shape in a vertical plane for maximum visibility, wherein said attachment means include engagement means having first and second surfaces for respective engagement with upper edge and upper inside surfaces of a side window of said vehicle when securing said one of said components to said vehicle, said engagement means being arranged to be then clamped between an upper end of said window and a frame for said window when said window is moved upwardly, said attachment means including a first wall portion that in said operative condition of said components extends generally horizontally and outwardly from said one of said components and to said engagement means, and a second wall portion that in said operative condition of said components extends outwardly and upwardly to said engagement means, and said attachment means further including a third wall portion that extends in a direction transverse to said first and second wall portions and that is joined to said first and second wall portions to strengthen said first and second wall portions against bending.

5. A warning device as defined in claim 4, wherein said first and second wall portions include narrow inward parts and wider outer parts, said attachment means further including a fourth wall portion that extends arcuately and that is joined to inward ends of said wider outer parts and to said third wall portion, and a fifth wall portion that extends in a direction transverse to said first and second wall portions and that is joined to said narrow inward parts thereof.

6. A warning device, comprising: an assembly of three elongated components having light reflecting means thereon, means for securing end portions of said components together for selective positioning thereof in either an operative condition in which said reflecting means form a triangular shape or an inoperable folded condition in which components are in a registering relation to provide a compact assembly for storage, and attachment means for functioning in said operative condition of said components to releasably secure one of said components to a vehicle while placing one of said reflecting means in a generally horizontal position and placing the other two reflecting means in positions extending upwardly from opposite ends of said one of said reflecting means to meet and form a triangular shape in a vertical plane for maximum visibility, wherein said attachment means include engagement means having first and second surfaces for respective engagement with upper edge and upper inside surfaces of a side window of said vehicle when securing said one of said components to said vehicle, said engagement means being arranged to be then clamped between an upper end of said window and a frame for said window when said window is moved upwardly, wherein said first and second surfaces of said engagement means are operative within one range of angles of said window to the horizontal to position said one of said reflecting means in a generally horizontal position, said engagement means further including third and fourth surfaces for engagement with upper edge and upper inside surfaces of said window and operative within a second less steep range of angles of said window to the horizontal to position said one of said reflecting means in a generally horizontal position.

7. A warning device as defined in claim 6 wherein each of said light reflecting means is of a red reflective material for providing a nighttime warning and forming part of an outer border of said triangular shape, and wherein each of said elongated components includes a portion of an orange fluorescent material for providing a daytime warning and forming part of an inner border of said triangular shape.

8. A warning device as defined in claim 6 wherein each of the outer edges of said triangular shape has a length of at least sixteen inches, wherein said red reflective material has a width of at least three-fourths of an inch and wherein said orange reflective material has a width of at least one inch.

* * * * *